US010008191B2

(12) United States Patent
Suzuki et al.

(10) Patent No.: US 10,008,191 B2
(45) Date of Patent: Jun. 26, 2018

(54) PLAYBACK DEVICE, PLAYBACK METHOD, AND STORAGE MEDIUM

(71) Applicant: CASIO COMPUTER CO., LTD., Tokyo (JP)

(72) Inventors: Taiju Suzuki, Tokyo (JP); Osamu Moriyama, Tokyo (JP); Fumiaki Ota, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 180 days.

(21) Appl. No.: 14/796,884

(22) Filed: Jul. 10, 2015

(65) Prior Publication Data

US 2016/0019024 A1 Jan. 21, 2016

(30) Foreign Application Priority Data

Jul. 16, 2014 (JP) ................................ 2014-146327

(51) Int. Cl.
*G06F 17/00* (2006.01)
*G10H 1/00* (2006.01)
*G10H 1/42* (2006.01)

(52) U.S. Cl.
CPC ......... *G10H 1/0033* (2013.01); *G10H 1/0025* (2013.01); *G10H 1/42* (2013.01);
(Continued)

(58) Field of Classification Search
CPC ...... G10H 1/0033; G10H 1/0025; G10H 1/42; G10H 2210/076; G10H 2210/125; G10H 2210/141; G10H 2220/081; G10H 2250/641; G10H 2240/161; G10H 2210/351; G10H 2210/346; G10H 2210/341; G10H 2210/105; G10H 2210/005; G10H 2220/155; G10H 2220/221; G10H 2220/261; G10H 2220/265; G11B 27/007;
(Continued)

(56) References Cited

U.S. PATENT DOCUMENTS 5,566,306 A * 10/1996 Ishida .................... G06F 13/18
710/27
2002/0020279 A1 2/2002 Funaki
(Continued)

FOREIGN PATENT DOCUMENTS

JP 2001-306069 A 11/2001

*Primary Examiner* — Fan Tsang
*Assistant Examiner* — David Siegel
(74) *Attorney, Agent, or Firm* — Chen Yoshimura LLP

(57) ABSTRACT

A playback device includes a first buffer and a second buffer, each having storage regions, and a processing unit. The processing unit performs: a storage process that causes input audio data to be stored in the storage regions of the first buffer in order; a first playback process that causes the stored audio data to be played back in the order in which the audio data was stored; a designation process that designates, in response to a user input, at least one of the plurality of storage regions of the first buffer in which the audio data is stored; a copy process that causes the audio data stored in the first designated storage region of the first buffer to be copied to the second buffer; and a second playback process that causes the audio data copied to the second buffer to be repeatedly played back.

16 Claims, 16 Drawing Sheets

(52) U.S. Cl.
CPC . *G10H 2210/076* (2013.01); *G10H 2210/125* (2013.01); *G10H 2220/026* (2013.01); *G10H 2220/081* (2013.01); *G10H 2250/641* (2013.01)

(58) Field of Classification Search
CPC .. G11B 2020/10546; G11B 2020/1062; G11B 2020/10666; G11B 2020/10777
See application file for complete search history.

(56) References Cited

U.S. PATENT DOCUMENTS

2003/0103422 A1* 6/2003 Miyashita ............ G10H 1/0041 369/30.23
2011/0015766 A1* 1/2011 Gehring ............... G10H 1/0066 700/94

* cited by examiner

PLAYBACK DEVICE, PLAYBACK METHOD, AND STORAGE MEDIUM

BACKGROUND OF THE INVENTION

Technical Field

The present invention relates to audio playback technology.

Background Art

One effect that is commonly applied to music signals is audio slicing. Audio slicing allows a user to define a desired start point and end point to create a slice of music signal data from a given music signal.

Patent Document 1 (Japanese Patent Application Laid-Open Publication No. 2001-306069) discloses one conventional technology for implementing an audio slicing feature, for example. In this conventional technology, the user can edit performance data divided into a plurality of segments. A series of blocks that represent each segment are displayed. The user uses the mouse pointer to select a block. The user can then drag the edges of the selected block (that is, the positions where divisions between the selected block and the adjacent blocks are inserted) to change the length of the selected block (and the length of the segment represented thereby). The lengths of the adjacent blocks are updated automatically. After the length of a block is changed, icons are displayed at the positions where the divisions between blocks were previously located for the user's reference. To play back the performance data when no segment is selected, the user uses a restart switch to move a grid pointer to the beginning of the performance data and then uses a start playback switch to play the performance data to the very end thereof. When a segment is selected, the restart switch moves the grid pointer to the beginning of the selected segment, and the start playback switch plays the performance data though to the end of the selected segment.

RELATED ART DOCUMENT

Patent Document

Patent Document 1: Japanese Patent Application Laid-Open Publication No. 2001-306069

SUMMARY OF THE INVENTION

In the conventional technology described above, however, the music signal to slice must be prepared ahead of time in a musical instrument and must conform to playback pointers inserted at designated locations in order to be able to later slice the data. Therefore, an arbitrary music signal from an external source, for example, could not be sliced in real time.

The present invention aims to provide an audio slicing feature for slicing music signal data in real time.

To achieve these and other advantages and in accordance with the purpose of the present invention, as embodied and broadly described, in one aspect, the present disclosure provides a playback device that includes a first buffer and a second buffer, each having a plurality of storage regions, and a processing unit, wherein the processing unit performs: a storage process that causes input audio data to be stored in the storage regions of the first buffer in order; a first playback process that causes the stored audio data to be played back in the order in which the audio data was stored; a designation process that designates, in response to a user input, at least one of the plurality of storage regions of the first buffer in which the audio data is stored; a copy process that causes the audio data stored in the designated storage region of the first buffer to be copied to the second buffer; and a second playback process that causes the audio data copied to the second buffer to be repeatedly played back.

In another aspect, the present disclosure provides a playback method for a playback device that includes a first ring buffer and a second ring buffer each having a plurality of storage regions, the playback method including: storing input audio data in the storage regions of the first ring buffer in order; playing back the stored audio data in the order in which the audio data was stored; designating at least one of the plurality of storage regions of the first ring buffer in which the audio data is stored in response to a user input; copying the audio data stored in the designated storage regions of the first ring buffer to the second ring buffer; and repeatedly playing back the audio data copied to the second ring buffer while terminating the playing back of the audio data stored in the first ring buffer.

In another aspect, the present disclosure provides a non-transitory storage medium that stores instructions executable by a playback device having a processor and a first ring buffer and a second ring buffer each having a plurality of storage regions, the instructions causing the processor of the playback device to perform the following: causing input audio data to be stored in the storage regions of the first ring buffer in order; causing the stored audio data to be played back in the order in which the audio data was stored; designating at least one of the plurality of storage regions of the first ring buffer in which the audio data is stored in accordance with a user input; causing the audio data stored in designated storage regions of the first ring buffer to be copied to the second ring buffer; and causing the audio data copied to the second ring buffer to be repeatedly played back.

It is to be understood that both the foregoing general description and the following detailed description are exemplary and explanatory, and are intended to provide further explanation of the invention as claimed.

DETAILED DESCRIPTION OF EMBODIMENTS

Figure 1:
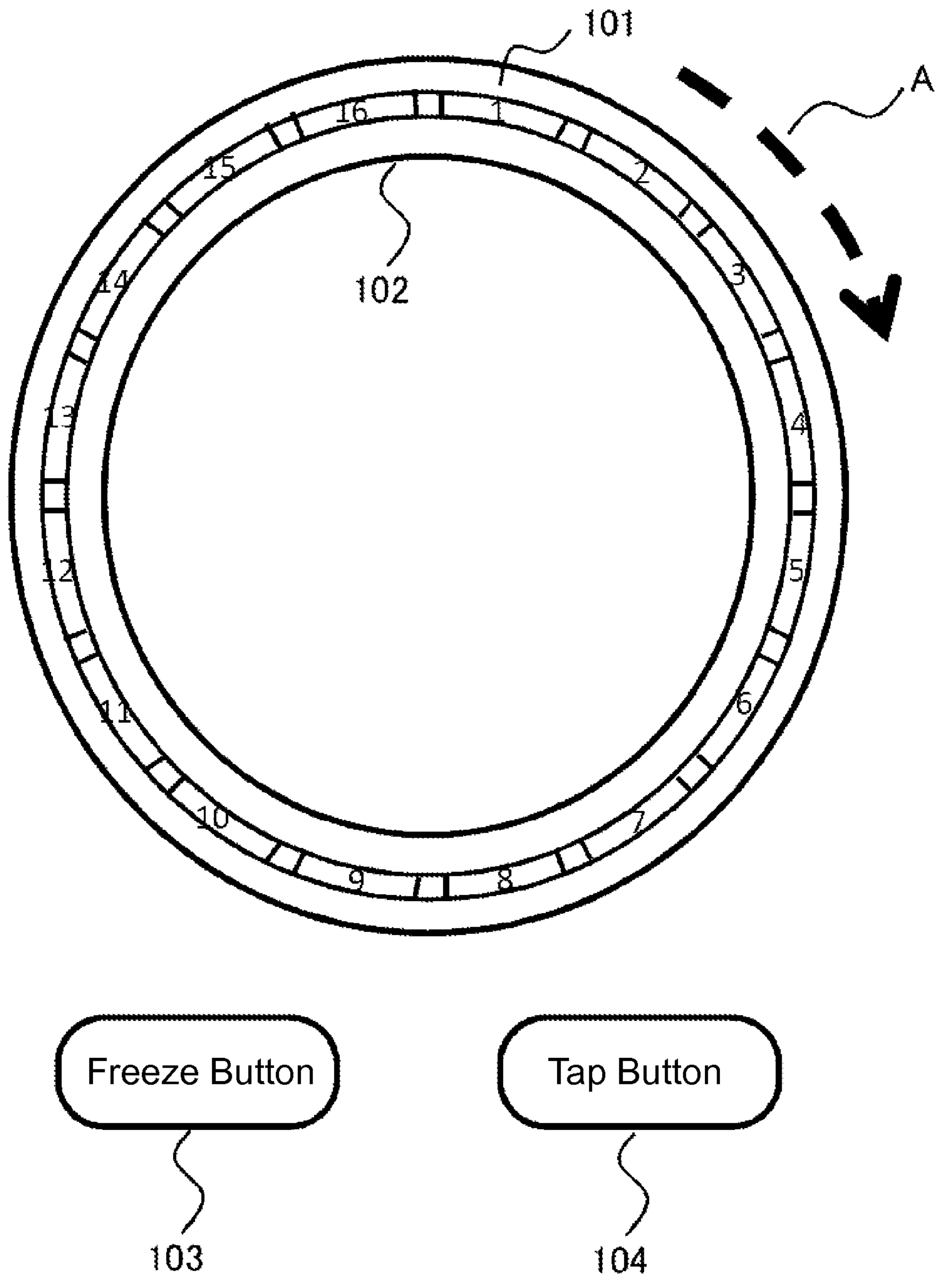
FIG. 1 illustrates an example of a musical sound playback device according to an embodiment of the present invention.

An embodiment of the present invention will be described in detail below with reference to figures. FIG. 1 illustrates an example of a musical sound playback device according to an embodiment of the present invention. The musical sound playback device of the present embodiment may be implemented as an effect-adding device that slices an input musical signal in real time. This musical sound playback device includes a musical sound playback unit (not shown in the figures) that employs a built-in sequencer to play back a musical sound at a user-designated tempo, and an external signal input terminal (not shown in the figures) into which music signal data from an external source can be input in order to be mixed with the musical sound played back by the sequencer.

As shown in FIG. 1, in this musical sound playback device, 16 LEDs/touch-type sensors 101 for designating the timing at which to slice music signal data (LED-timing sensors 101) are numbered 1 to 16 and arranged in a ring around a ring-shaped chassis 102. Each LED-timing sensor 101 corresponds to a sixteenth note. When the user starts the sequencer using a switch (not shown in the figures), the sequencer sounds and the music signal data mixed therewith are played back at the user-designated tempo. The LED-timing sensors 101 light up for the duration of the associated sixteenth note and then turn off in order in a repeating loop from number 1 to number 16 (that is, in the clockwise direction indicated by arrow A in FIG. 1) and in time with the user-designated tempo. Therefore, each revolution around the 16 LED-timing sensors 101 corresponds to 1 bar of music signal data.

As shown in FIG. 1, the musical sound playback device according to the present embodiment includes a tap button 104. When the user taps this tap button 104 a single time, the sequencer is reset to the beginning of the current bar, and the position of the next LED-timing sensor 101 to be illuminated is reset to position number 1.

Moreover, the user can tap the tap button 104 twice at a desired tempo to change the playback tempo accordingly.

Figure 2:
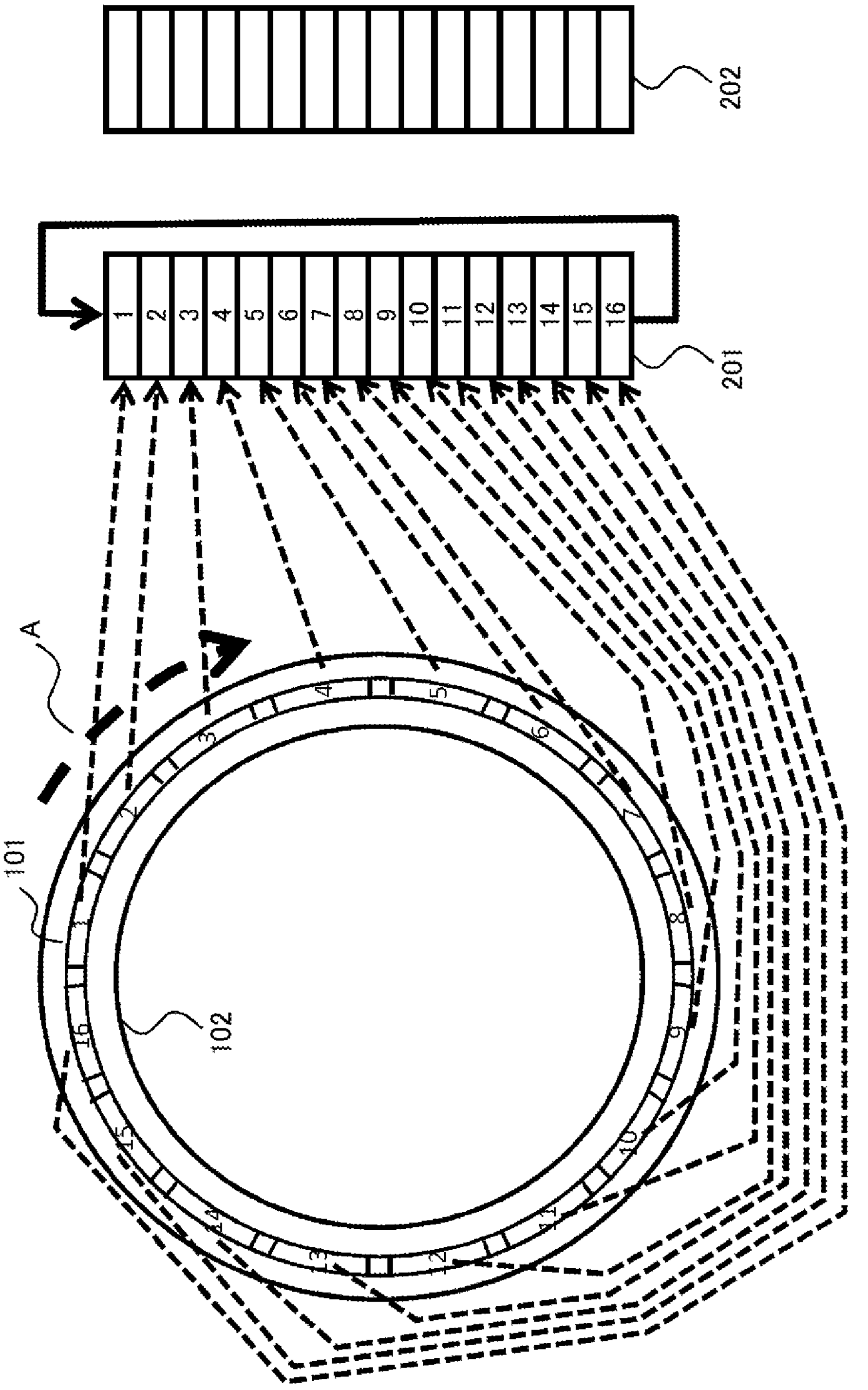
FIG. 2 illustrates how illumination of LEDs corresponds to storage of data in a recording ring buffer.

FIG. 2 illustrates how the LED-timing sensors 101 in FIG. 1 correspond to storage regions in a recording ring buffer 201. The musical sound playback device according to the present embodiment includes a recording ring buffer 201 and a playback ring buffer 202. These buffers 201 and 202 each store, in numbered storage regions, the maximum storable number of samples at a predetermined minimum sampling rate that does not depend on the playback tempo set when the corresponding music signal data was recorded. When this music signal data is played back, sampled music signal data are selected and loaded from these stored samples according to the currently designated playback tempo.

As shown in FIG. 2, while the light is making a revolution around the 16 LED-timing sensors 101 on the ring-shaped chassis 102, groups of sampled music signal data that each correspond to the period of time during which the corresponding LED-timing sensor 101 was illuminated are stored in the associated numbered storage regions in the recording ring buffer 201. These groups of sampled music signal data are sampled from music signal data that includes the sequencer sounds plus the external music signals. In other words, as shown by the bold dashed lines in FIG. 2, when the LED-timing sensor 101 in position number 1 lights up, for example, a group of sampled music signal data sampled from the currently playing music signal data are sequentially stored in storage region number 1 of the recording ring buffer 201. When the LED-timing sensor 101 in position number 2 lights up, a group of sampled music signal data sampled from the currently playing music signal data are sequentially stored in storage region number 2.

Once a group of sampled music signal data has been sequentially stored in storage region number 16 and the LED-timing sensor 101 in position number 1 on the ring-shaped chassis 102 lights up again, the existing group of sampled music signal data stored in storage region number 1 of the recording ring buffer 201 is overwritten with a new group of sampled music signal data. In this way, a full bar (a prescribed segment) of the input music signal data is stored sequentially in the storage regions of the recording ring buffer 201 (a first buffer) in a repeating and cyclical manner. Moreover, the process by which the sampled music signal data are actually stored in the storage regions may be synchronized with the intervals at which the input music signal data is sampled and performed each time a full sample group is taken, for example.

The playback ring buffer 202 in FIG. 2 has the same storage capacity as the recording ring buffer 201 but operates differently, as will be described in more detail later.

As described above, when the user starts playback of the sequencer sound/external music signal mix, the 16 LED-timing sensors 101 on the ring-shaped chassis 102 light up and turn off in order one by one in the clockwise direction indicated by arrow A in FIG. 2 and in time with the current tempo.

Figure 3:
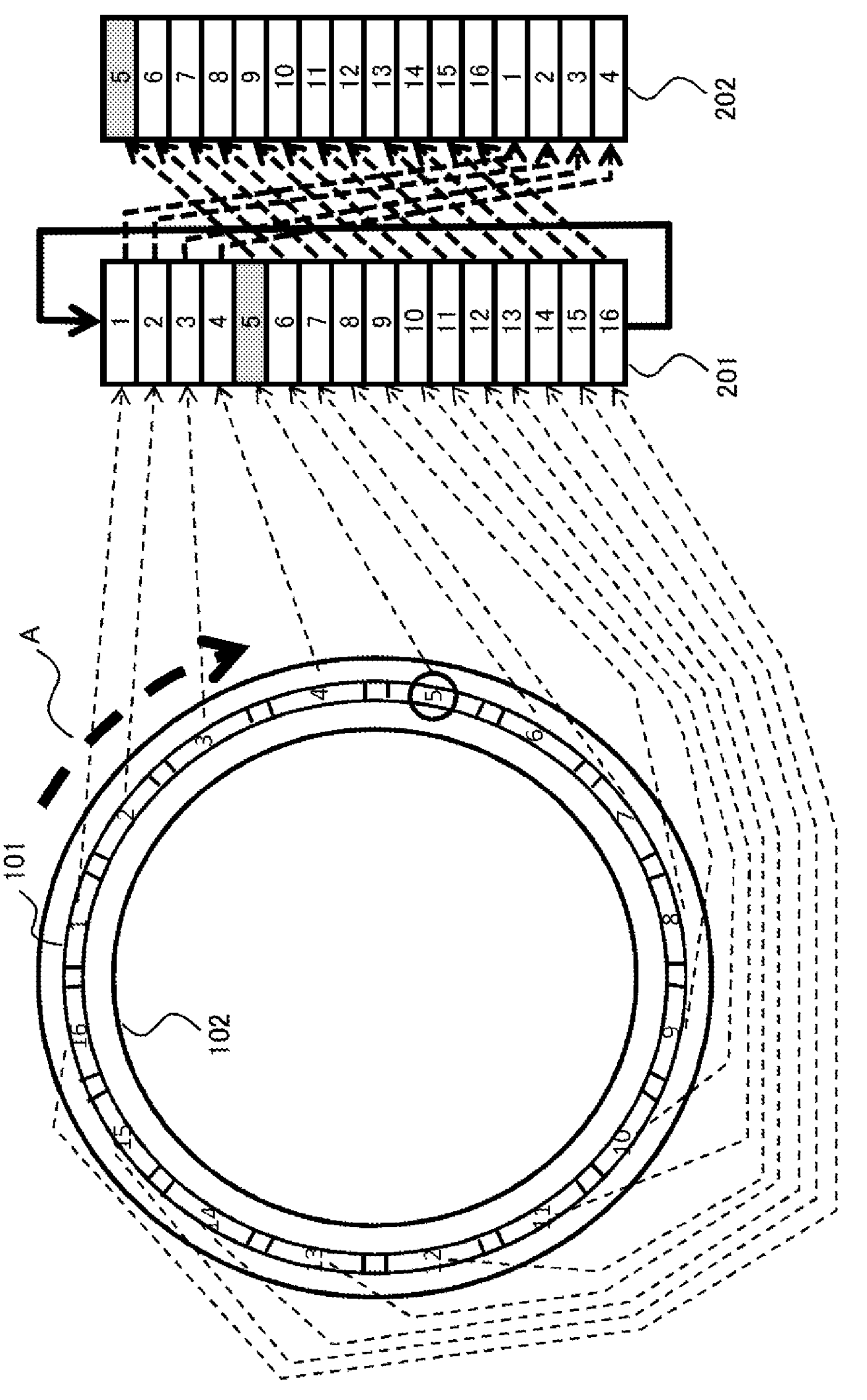
FIG. 3 illustrates the relationship between regions in the recording ring buffer and a playback ring buffer once a slice start step has been designated.

While listening to the music signal data being played at the current tempo, the user can press one of the LED-timing sensors 101 in order to create a slice of music signal data starting at that point. In the following description, the sixteenth notes corresponding to each LED-timing sensor 101 are referred to simply as "steps". Moreover, the step the user designates as the starting point for the slice is the "slice start step". FIG. 3 illustrates how this slice operation works. FIG. 3 also illustrates the relationship between samples stored in the recording ring buffer 201 and the playback ring buffer 202 once a slice start step has been designated. FIG. 3 depicts a case in which the user has pressed the LED-timing sensor 101 in position number 5. As shown by the bold dashed arrows between the recording ring buffer 201 and the playback ring buffer 202, the groups of sampled music signal data stored in the recording ring buffer 201 are copied in order to the playback ring buffer 202, with the group of sampled music signal data in storage region number 5 in the recording ring buffer 201 being copied to the first storage region in the playback ring buffer 202. The process by which the sampled music signal data are copied may be synchronized with the intervals at which the music signal data is sampled and performed each time a complete sample group is taken, for example. Once the group of sampled music signal data in storage region number 16 in the recording ring buffer 201 have been copied, the copy process returns to the beginning of the recording ring buffer 201 and copies the group of sampled music signal data in storage region number 1 to the storage region after storage region number 16 in the playback ring buffer 202, and so on.

In the present embodiment, music signal data is copied in order to the playback ring buffer starting from the starting address thereof. However, the present embodiment may also be configured such that a consistent offset from the starting addresses of the recording ring buffer and the playback ring buffer is maintained (that is, such that the samples stored in storage region number M in the recording ring buffer 201 are always copied to storage region number M in the playback ring buffer 202, for example).

In this way, one full bar of music signal data starting from the user-designated slice start step is copied to the playback ring buffer 202, as shown in FIG. 3. The user may designate the slice start step (step number 5 in FIG. 3) either exactly when the LED-timing sensor 101 corresponding to that step illuminates and the corresponding portion of the music signal data is playing or at any point when the corresponding LED-timing sensor 101 is not illuminated. Furthermore, the input music signal data continues to be sequentially stored in the recording ring buffer 201 after the user designates a slice start step and groups of sampled music signal data start being copied from the recording ring buffer 201 to the playback ring buffer 202. The processes by which input music signal data is sequentially stored in the recording ring buffer 201 and by which that music signal data is copied from the recording ring buffer 201 to the playback ring buffer 202 are executed in synchronization with the sampling interval. This makes it possible to correctly copy one continuous bar of groups of sampled music signal data starting from the slice start step in the recording ring buffer 201 to the playback ring buffer 202.

Figure 4:
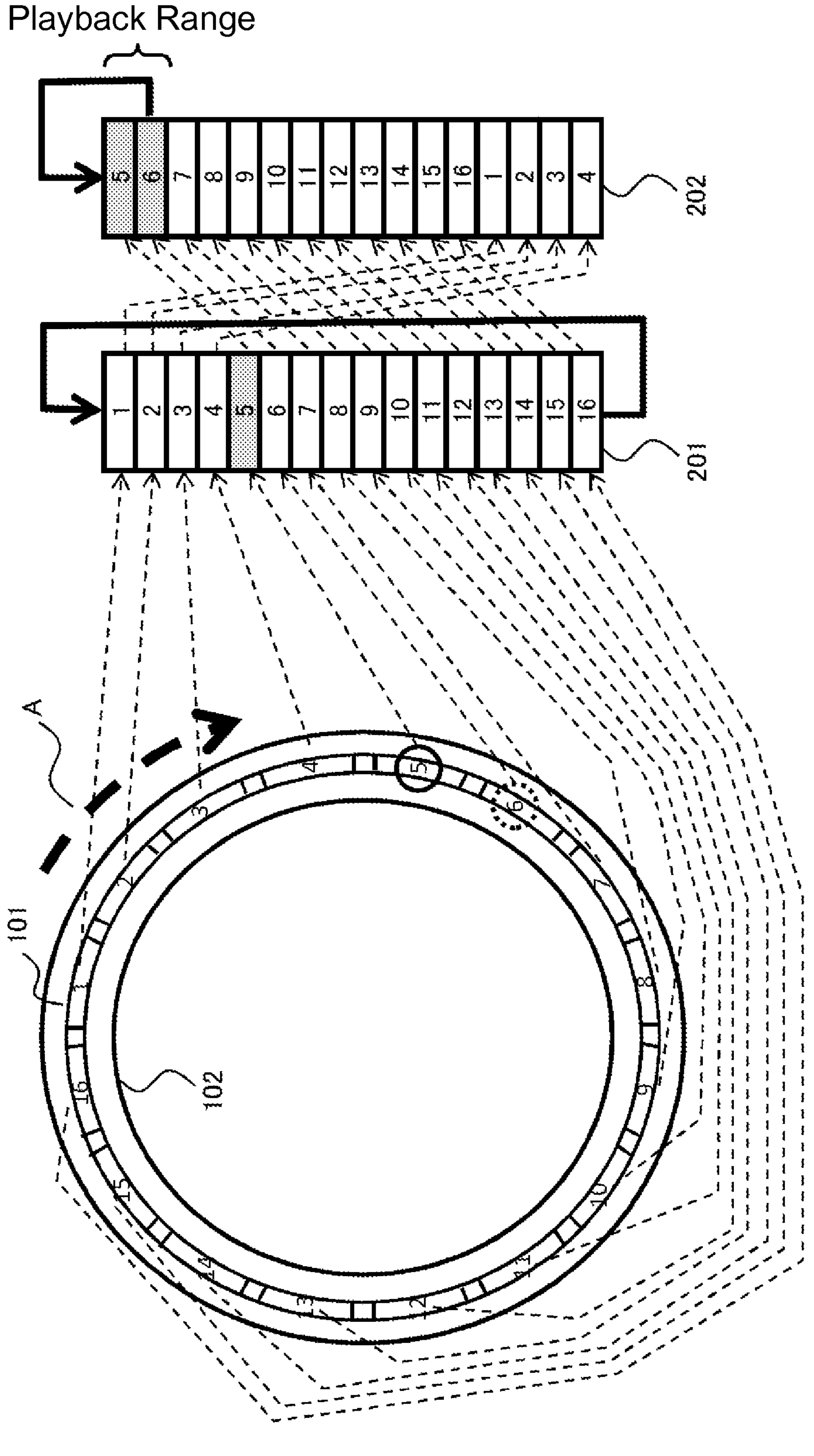
FIG. 4 illustrates how a playback process works when the user has only designated a slice start step.

Once the user designates a slice start step, the musical sound playback device stops playing the input music signal data and starts playing the slice of music signal data stored in the playback ring buffer 202. Here, the user has only designated the slice start step at which the slice should start and has not yet designated the step at which the slice should end. The default behavior of the musical sound playback device in this case is to repeatedly play 2 steps of music signal data (an amount equal in duration to an eighth note), for example, starting from the slice start step. FIG. 4 illustrates this behavior and shows how the playback process works when only the slice start step has been designated. In this case, the musical sound playback device plays the group of sampled music signal data corresponding to the slice start step (step number 5) that was copied to the first storage region in the playback ring buffer 202 and then plays the group of sampled music signal data corresponding to step number 6 that was copied to the next storage region in the playback ring buffer 202. As shown by the arrow at the top of the playback ring buffer 202 in FIG. 4, once playback of the group of sampled music signal data stored in storage region number 6 completes, the group of sampled music signal data stored in storage region number 5 is played again, and so on. Therefore, when the user has only designated the slice start step, the musical sound playback device plays an eighth note's worth of groups of sampled music signal data starting from that slice start step in the playback ring buffer 202.

Figure 5:
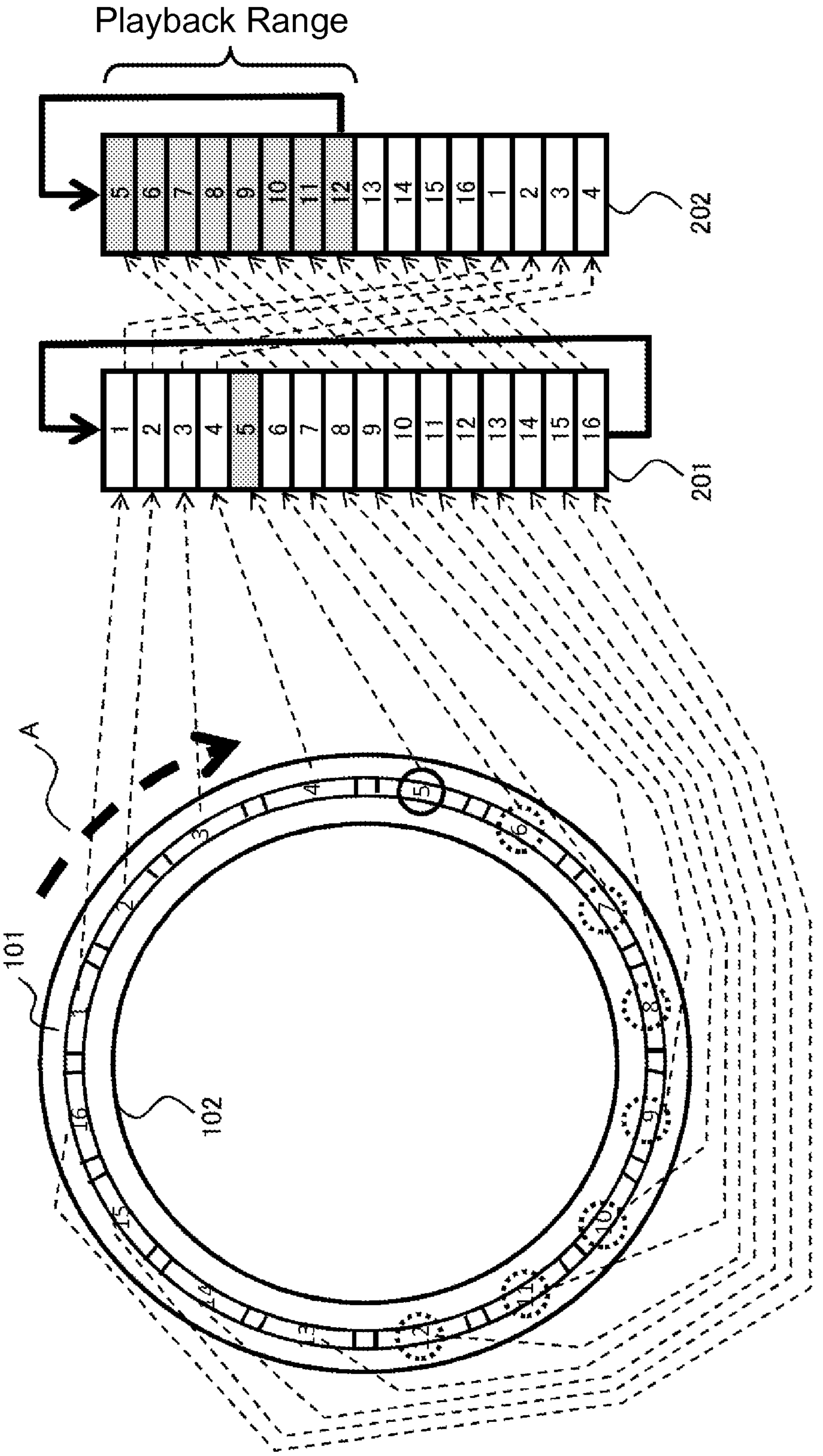
FIG. 5 illustrates how the playback process works once the user has designated a slice end step.

Next, the user can press another one of the LED-timing sensors 101 in order to end the slice of music signal data at that point. Here, the step the user designates as the ending point for the slice is the "slice end step". FIG. 5 illustrates how the playback process works once the user has designated a slice end step. FIG. 5 depicts a case in which the user has designated step number 12 as the slice end step, for example. Once the user has designated a slice end step, the musical sound playback device repeatedly plays the slice of music signal data beginning at the slice start step and ending at the slice end step. In other words, the musical sound playback device plays, in order, the groups of sampled music signal data starting from the group of sampled music signal data corresponding to the slice start step (step number 5) that was copied to the first storage region in the playback ring buffer 202 and ending with the group of sampled music signal data corresponding to step number 12. As shown by the arrow at the top of the playback ring buffer 202 in FIG. 5, once playback of the group of sampled music signal data stored in storage region number 12 completes, the group of sampled music signal data stored in storage region number 5 is played again, and so on. Therefore, once the user has designated the slice start step and the slice end step and has thereby designated a complete slice of music signal data, the musical sound playback device repeatedly plays the groups of sampled music signal data corresponding to that slice from the playback ring buffer 202.

In this way, as the input music signal data is sequentially stored in the recording ring buffer 201 and played back, the user can designate a slice of music signal data by designating a slice start step and a slice end step, and the full bar of music signal data that includes the designated slice and is stored in the recording ring buffer 201 is copied to the playback ring buffer 202. Furthermore, of the music signal data copied to the playback ring buffer 202, the music signal data corresponding to the user-designated slice is repeatedly played back. In this way, a music signal can be sliced in real time. Moreover, the user can easily switch between playback of input music signal data that includes the external music signal and playback of the internally stored slice of music signal data by using the LED-timing sensors 101. Playback of the slice of music signal data is looped, thereby making it possible to smoothly recompose an music signal in an intuitive manner and without inadvertently creating periods of silence. Moreover, there is no need to prepare music signal data ahead of time, and any arbitrary music signal can be edited in real time. Conventional audio slicing technologies require pointers to be aligned at the appropriate playback positions. The present embodiment, however, provides a user interface with which a slice start step and a slice end step can be designated immediately while listening to music signal data being played in real time.

In the state shown in FIG. 5, the user has pressed the LED-timing sensors 101 in positions number 5 and 12 to designate those steps as the slice start step and the slice end step, respectively. If, in this state, the user presses the LED-timing sensor 101 in position number 12 (which corresponds to the slice end step) again, looped playback of the current slice continues. In this state, the user can then press another LED-timing sensor 101 to designate a different slice end step and create a new slice of music signal data (similar to how the user pressed the LED-timing sensor 101 in position number 12 to create the slice in the case shown in FIG. 5). The musical sound playback device then begins looped playback of the new slice of music signal data (from the slice start step to the new slice end step) from the playback ring buffer 202, which still stores a full bar of music signal data starting from the slice start step.

If, while in the states shown in FIGS. 4 and 5 (in which step number 5 has been designated as the slice start step), the user presses the LED-timing sensor 101 in position number 5 that corresponds to the slice start step again, the musical sound playback device returns to the state shown in FIG. 2, and the contents of the playback ring buffer 202 are cleared. The behavior of the device at this time is the same as the behavior described in reference to FIG. 2.

Figure 6:
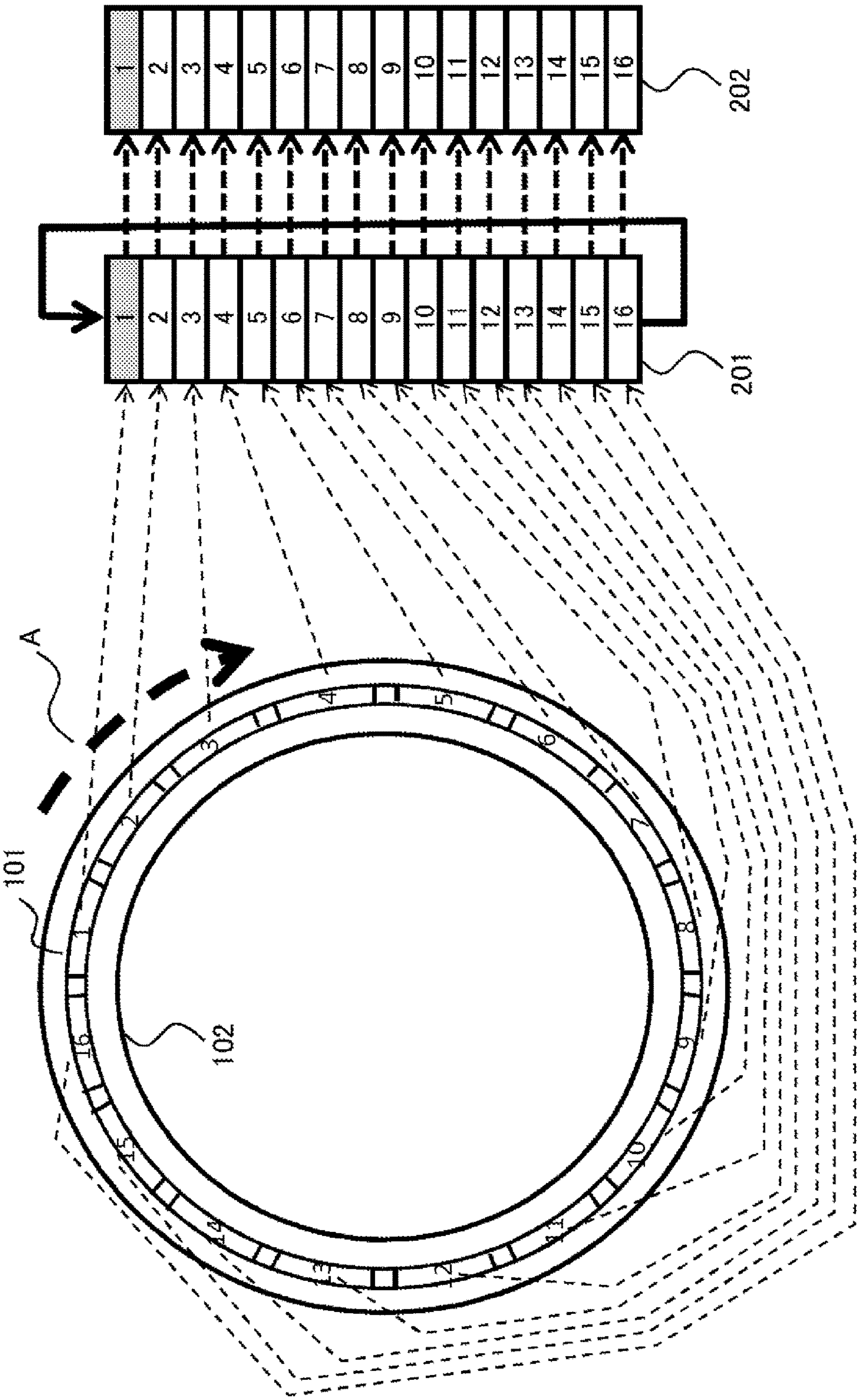
FIG. 6 illustrates the relationship between regions in the recording ring buffer and the playback ring buffer when the musical sound playback device is in a freeze state.

While the device is in the state shown in FIG. 2, the user can press the freeze button 103 shown in FIG. 1 at any time. FIG. 6 illustrates what happens when the user presses the freeze button 103 while the device is in the state shown in FIG. 2 and shows the resulting relationship between the contents of the recording ring buffer 201 and the contents of the playback ring buffer 202 once the freeze operation has been performed. Assume, for example, that while the device is in the state shown in FIG. 2, the user presses the freeze button 103 just after the LED in the LED-timing sensor 101 in position number 16 turns off but just before the next LED-timing sensor 101 (in position number 1) illuminates. In this case, as shown by the bold dashed arrows in FIG. 6 between the recording ring buffer 201 and the playback ring buffer 202, the groups of sampled music signal data corresponding to the most recent bar of music signal data stored in the recording ring buffer 201 (here, from the step number 1 from a full bar earlier to the step number 16 that just occurred) are copied to the playback ring buffer 202. Moreover, the freeze button 103 may also be pressed at any desired timing. If the user presses the freeze button 103 immediately before the LED in the LED-timing sensor 101 in position number 4 turns off, for example, a situation similar to the one described in reference to FIG. 3 results. Again, the groups of sampled music signal data corresponding to the most recent bar of music signal data stored in the recording ring buffer 201 (here, from the step number 5 from a full bar earlier to the step number 4 that just occurred) are copied to the playback ring buffer 202.

Furthermore, after the groups of sampled music signal data corresponding to the most recent bar of music signal data are copied from the recording ring buffer 201 to the playback ring buffer 202, the contents of the recording ring buffer 201 begin to be overwritten with new groups of sampled music signal data as the input music signal data continues to play back. However, the contents of the playback ring buffer 202 do not change.

Figure 7:
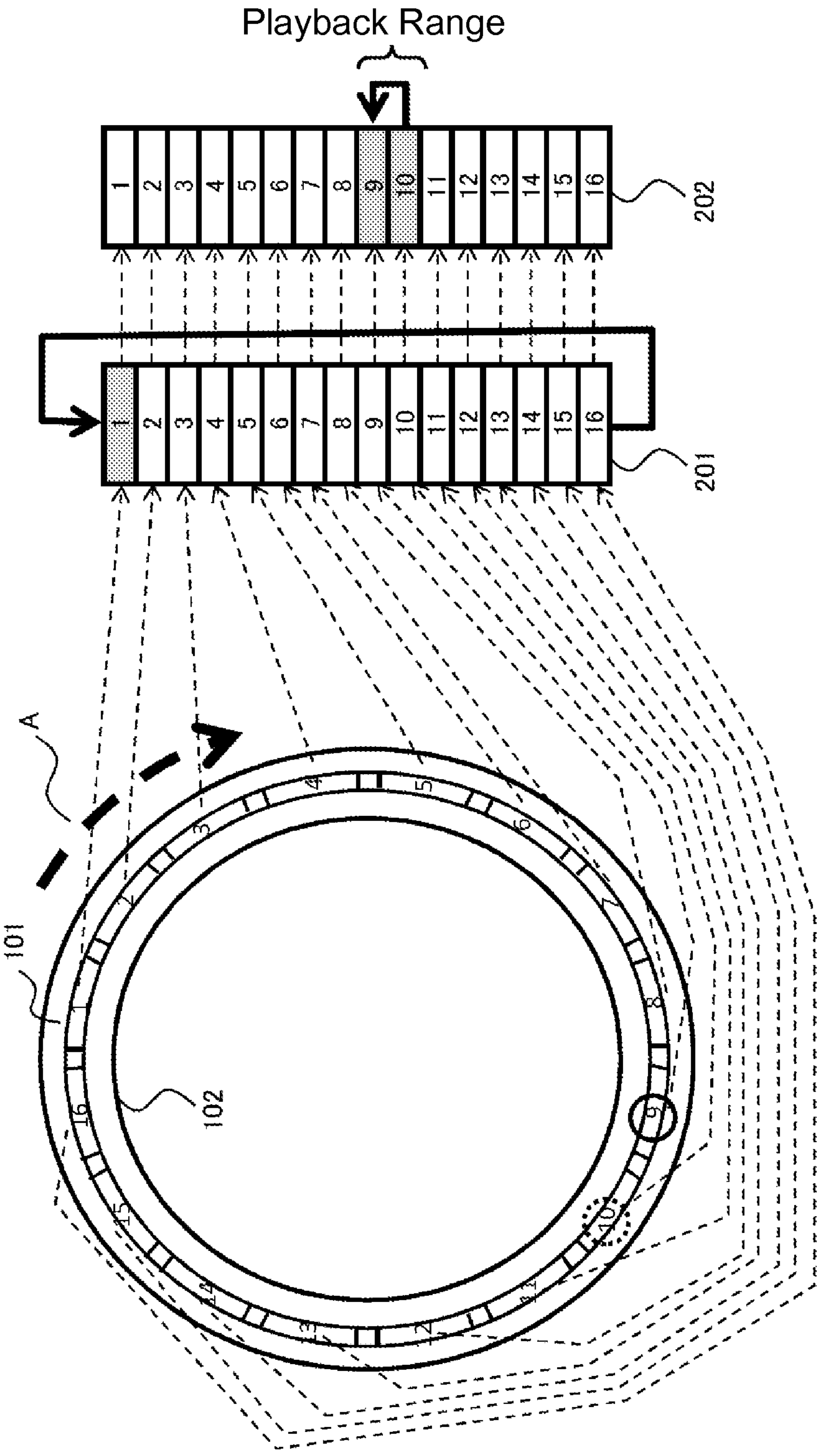
FIG. 7 illustrates how the playback process works when the device is in the freeze state and the user designates a slice start step.

When the user presses the freeze button 103, the musical sound playback device does not transition into the looped slice playback mode. Moreover, after the user taps the freeze button 103, the current freeze state persists as long as the user does not press the freeze button 103 again. During this freeze state, the user can designate a slice start step and a slice end step as described above. FIG. 7 illustrates this behavior and shows how the playback process works when the device is in the freeze state and only the slice start step has been designated. As shown in FIG. 7, if the user designates step number 9 as the slice start step while the device is in the freeze state, the musical sound playback device stops playing the input music signal data and starts playing the slice of music signal data stored in the playback ring buffer 202. Like the case shown in FIG. 4, in this case the user has only designated the slice start step at which the slice should start (here, step number 9) and has not yet designated the step at which the slice should end. As shown in FIG. 7, in this case, like the case shown in FIG. 4, the default behavior of the musical sound playback device is to repeatedly play 2 steps of music signal data (an amount equal in duration to an eighth note; here, steps number 9 and 10), for example, starting from the slice start step (step number 9).

Figure 8:
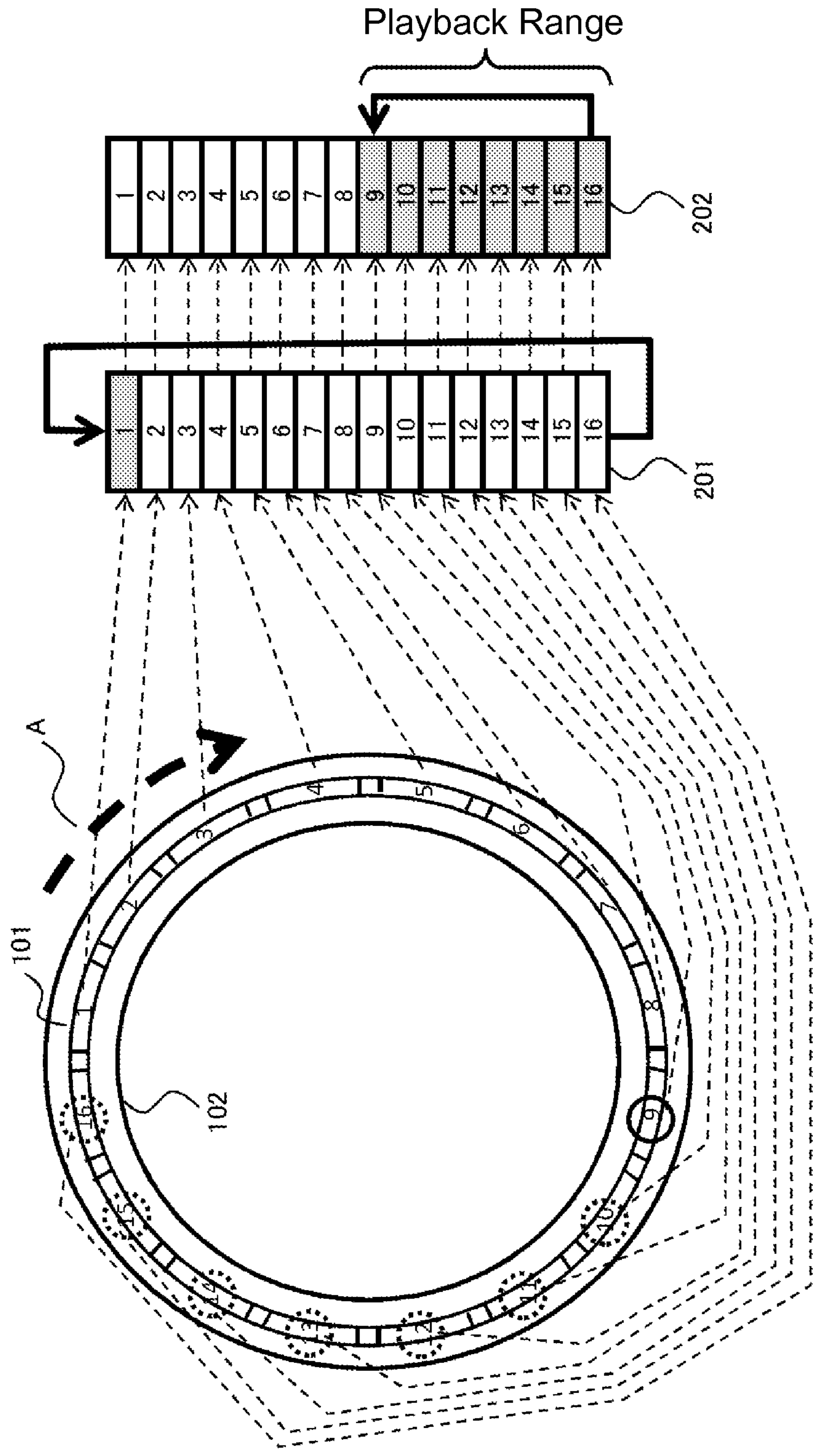
FIG. 8 illustrates how the playback process works when the device is in the freeze state and the user designates a slice end step.

FIG. 8 illustrates how the playback process works when the device is in the freeze state and the user designates a slice end step. FIG. 8 depicts a case in which the user has designated step number 16 as the slice end step, for example. Once the user has designated a slice end step, the musical sound playback device repeatedly plays the slice of music signal data beginning at the slice start step (here, step number 9) and ending at the slice end step (here, step number 16).

However, slicing works slightly differently when the device is in the freeze state as compared to the normal slice behavior described in reference to FIGS. 3 to 5. During normal slicing, if the user presses the LED-timing sensor 101 corresponding to the current slice start step again, looped slice playback mode is deactivated and playback of the input music signal data resumes. Therefore, if the user selects a new slice start step, the new slice is taken from a new segment of the input music signal data. In contrast, once the user has frozen a bar of music signal data into the playback ring buffer 202 using the freeze button 103, that bar of music signal data remains stored in the playback ring buffer 202 until the current freeze state is deactivated. Therefore, if, while the device is in the freeze state, the user disables the current slice start step and designates a new slice start step, the new slice is taken from the same segment of music signal data that is still currently stored in the playback ring buffer 202.

Finally, the user can disable the current freeze state by pressing the freeze button 103 again.

Figure 9:
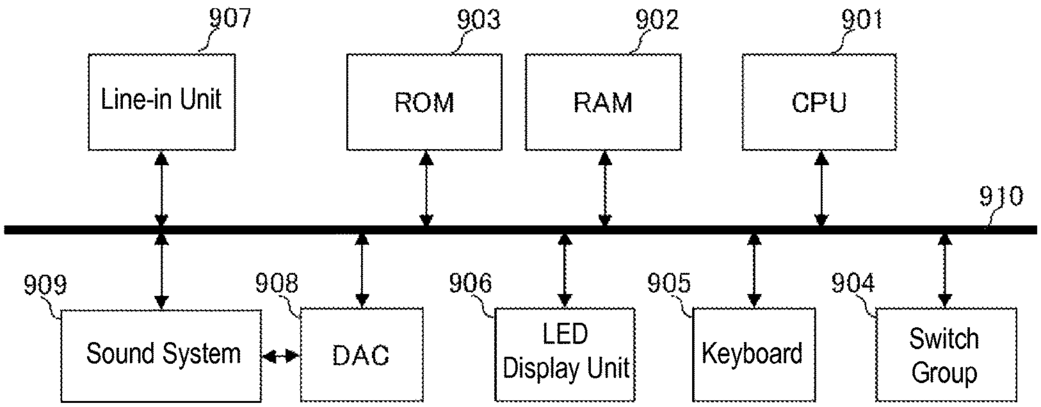
FIG. 9 illustrates an example of a hardware configuration for the musical sound playback device.

FIG. 9 illustrates an example of a hardware configuration for the musical sound playback device according to the present embodiment that supports the slicing and freeze features described in reference to FIGS. 2 to 8. The musical sound playback device shown in FIG. 9 includes: a central processing unit (CPU) 901; a random-access memory (RAM) 902; a read-only memory (ROM) 903; a switch group 904; a keyboard 905; an LED display unit 906; a line-in unit 907; a digital-to-analog converter (DAC) 908; a sound system 909; and a system bus 910 that connects all of these components to one another. The configuration shown in FIG. 9 is only an example of a hardware configuration for the musical sound playback device. The musical sound playback device of the present embodiment is not limited to this configuration.

The CPU 901 controls the overall musical sound playback device. The ROM 903 stores the control programs illustrated by the flowcharts in FIGS. 10 to 16. The CPU 901 controls the musical sound playback device by executing the programs stored in the ROM 903 while assigning the RAM 902 as the recording ring buffer 201, the playback buffer 202, an address register A that causes data to be stored in these ring buffers 201 and 202 and that reads this data for playback, and/or as another working region.

The switch group 904 includes various types of switches typically found in electronic musical instruments as well as switches for the tap button 104 and the freeze button 103 shown in FIG. 1. The CPU 901 periodically scans the operational states of the switches in the switch group 904 according to a control program stored in the ROM 903. Once the CPU 901 detects a button press, the CPU 901 executes one of the processes shown in the flowcharts in FIGS. 10 to 13.

The keyboard 905 serves as a user interface that allows the user to play an electronic keyboard instrument. Any music the user plays on the keyboard 905 is input to a musical sound generation unit (not shown in the figures) controlled by the CPU 901, which generates music signal data corresponding to the music played by the user. This music signal data is then converted to an analog signal by the DAC 908, amplified by the sound system 909, and then sent to speakers, a headphone jack, a line-out terminal, or the like built into the sound system 909 for playback.

When the user starts the sequencer using the switch group 904, the CPU 901 inputs any preset or user-configured automatic musical performance data stored in the ROM 903 or the RAM 902 to the CPU 901-controlled musical sound generation unit (not shown in the figures), which generates the corresponding music signal data for the sequencer. The user can then use a slider switch or the like (not shown in the figures) in the switch group 904 to mix the music signal data from the sequencer with an external music signal input via the line-in unit 907. The user can then perform the slicing and freeze operations described above on this mixed music signal data. Any sliced music signal data is converted to an analog signal by the DAC 908, amplified by the sound system 909, and then sent to speakers, a headphone jack, a line-out terminal, or the like built into the sound system 909 for playback in the manner described above.

In the present embodiment, the musical sound playback device is configured to include components necessary for playback of music, such as the DAC 908 and the sound system 909. However, the musical sound playback device may also be configured not to include these components internally and such that these components can be connected to the musical sound playback device externally.

In the musical sound playback device of the present embodiment, the CPU 901 executes programs such as those depicted by the flowcharts in FIGS. 10 to 16 to implement features supported by the musical sound playback device. These programs may be stored and distributed using a portable storage medium (not shown in the figures) or distributed on a network and obtained via a communication interface (not shown in the figures), for example.

The LED display unit 906 includes the 16 LED-timing sensors 101 and the ring-shaped chassis 102 shown in FIG. 1.

Figure 10:
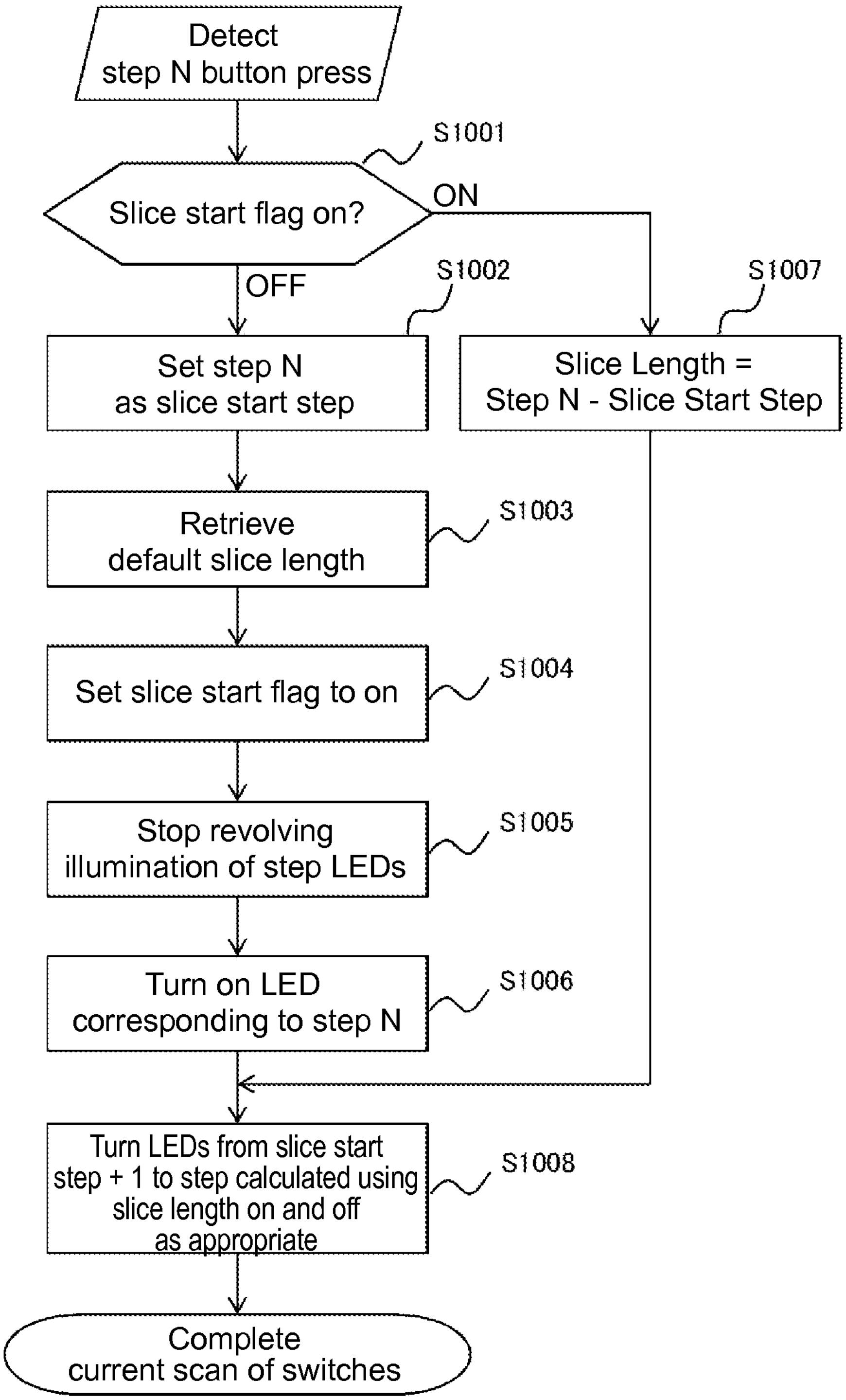
FIG. 10 is a flowchart illustrating an example of a process executed when the device detects that the user has pressed a button corresponding to an Nth step.

FIG. 10 is a flowchart illustrating an example of a process executed by the CPU 901 shown in FIG. 9 when the CPU 901 detects that one of the 16 LED-timing sensors 101 shown in FIG. 1 has been pressed while periodically scanning the operational states of the switches in the switch group 904 according to a control program stored in the ROM 903. In the description below, the LED-timing sensor 101 that has been pressed is denoted as step N.

First, the CPU 901 determines the current value of a slice start flag stored in the RAM 902 as a variable. Here, a logical value of 1 indicates that the flag is on and a logical value of 0 indicates that the flag is off, for example (S1001).

The first time the user has presses one of the LED-timing sensors 101 (shown in FIG. 1) after turning the musical sound playback device on, the slice start flag has an initial value of off because the slice feature has not yet been used. In this case, the CPU 901 sets a slice start step variable stored in the RAM 902 to a value of N corresponding to the LED-timing sensor 101 that the user pressed (S1002).

Next, the CPU 901 reads the default slice length value from the ROM 903 and sets that value to a slice length variable in the RAM 902 (S1003). This default value corresponds to the eighth note's worth of groups of sampled music signal data (that is, two steps) described above in reference to FIG. 4. Here, this value is 2, for example.

Next, the CPU 901 sets the slice start flag variable in the RAM 902 to on (that is, to a logical value of 1, for example) (S1004).

The CPU 901 then uses the variables stored in the RAM 902 to send an instruction to stop the revolving illumination of the LEDs in the 16 LED-timing sensors 101 shown in FIG. 1 (S1005). In other words, because normal playback of the music signal data stops once the user has designated a slice start step, as described above, the revolving illumination of the LED-timing sensors 101 is also stopped.

Then, the CPU 901 turns on the LED of the Nth LED-timing sensor 101 corresponding to the designated slice start step (S1006).

Finally, the CPU 901 sets a prescribed value to a prescribed variable in the RAM 902 in order to make the LEDs in the LED-timing sensors 101 from the slice start step+1 (that is, N+1) to the step calculated using the slice length variable stored in the RAM 902 turn on and off (S1008). The CPU 901 then finishes the current scan of the switches in the switch group 904.

For the case shown in FIG. 3, for example, in steps S1001 to S1006 the CPU 901 would detect that the LED-timing sensor 101 in position number 5 had been pressed and then illuminate LED-timing sensor 101 in position number 5. Moreover, in step S1008, the default slice length value is 2, for example. Therefore, starting at step 5+1=6 and continuing to the step calculated using a slice length of 1, the LEDs in the corresponding LED-timing sensors 101 would turn on and off. Here, the LED in the LED-timing sensor 101 in position number 6 would turn on and off.

Meanwhile, if the user has already designated a slice start step and the CPU 901 detects that the user has pressed another LED-timing sensor 101, the CPU 901 determines that the slice start flag is on and proceeds to step S1007. Here, the CPU 901 subtracts the slice start step value stored in the RAM 902 in step S1002 from the newly detected step N and sets the result to the slice length variable in the RAM 902 (S1007). Finally, the CPU 901 sets a prescribed value to a prescribed variable in the RAM 902 in order to make the LEDs in the LED-timing sensors 101 from the slice start step+1 to the step calculated using the slice length variable stored in the RAM 902 turn on and off (S1008). The CPU 901 then finishes the current scan of the switches in the switch group 904.

For the case shown in FIG. 5, for example, in steps S1007 and S1008 the CPU 901 would detect that the LED-timing sensor 101 in position number 12 had been pressed and designated as the slice end step. Then, starting at step 5+1=6 and continuing to the step calculated using a slice length of 12−5=7, the LEDs in the corresponding LED-timing sensors 101 would turn on and off. Here, as indicated by the dotted circles in FIG. 5, the LEDs in the LED-timing sensors 101 in position numbers 6 to 12 would turn on and off.

Figure 11:
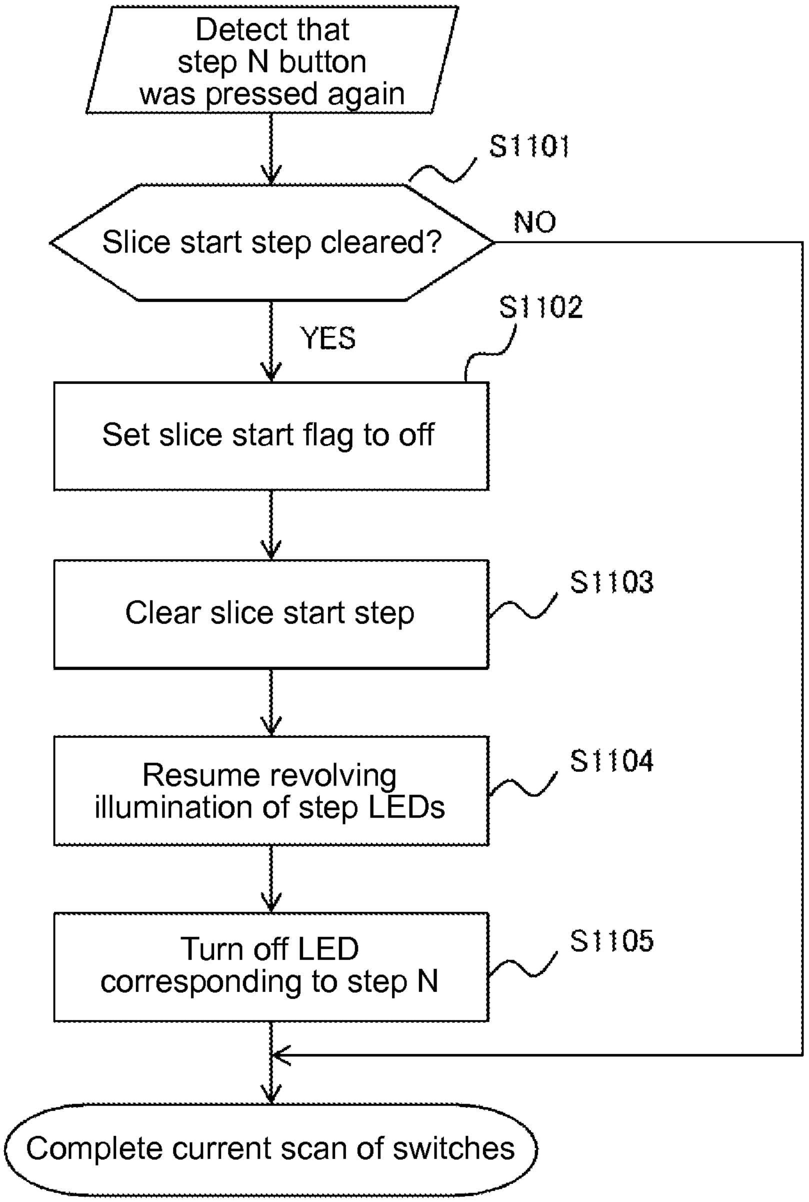
FIG. 11 is a flowchart illustrating an example of a process executed when the device detects that the user has pressed the button corresponding to the Nth step again.

FIG. 11 is a flowchart illustrating an example of a process executed by the CPU 901 shown in FIG. 9 when the CPU 901 detects that one of the 16 LED-timing sensors 101 shown in FIG. 1 that was pressed earlier has been pressed again while periodically scanning the operational states of the switches in the switch group 904 according to a control program stored in the ROM 903. In the description below, the LED-timing sensor 101 that has been pressed again is denoted as step N.

First, the CPU 901 determines whether the LED-timing sensor 101 corresponding to the slice start step has been pressed again by determining whether the step N for which another button press was just detected is the same step stored as the slice start step in the RAM 902 (S1101).

If the LED-timing sensor 101 for which another button press was just detected is not the slice start step (that is, if the determination in step S1101 yields NO), the CPU 901 simply finishes the current scan of the switches in the switch group 904. In this case, as in the case described in reference to FIG. 5 (in which the user presses the LED-timing sensor 101 in position number 12 again), looped playback of the current slice simply continues unchanged. If, however, the user then presses a different LED-timing sensor 101 to designate a different slice end step, the CPU 901 goes through S1001>S1007>S1008 in FIG. 10 to set a new slice length using the new slice end step.

If the determination in step S1101 yields YES, the CPU 901 sets the slice start flag variable in the RAM 902 to off (that is, to a logical value of 0, for example) (S1102).

Next, the CPU 901 clears the slice start step variable in the RAM 902 to clear the slice start step (S1103).

The CPU 901 then uses the variables stored in the RAM 902 to send an instruction to restart the revolving illumination of the LEDs in the 16 LED-timing sensors 101 shown in FIG. 1 (S1104). In other words, normal playback of the music signal data resumes once the user clears the slice start step, and therefore the revolving illumination of the LED-timing sensors 101 is also resumed.

Finally, the CPU 901 turns off the LED of the Nth LED-timing sensor 101 corresponding to the previously designated slice start step (S1105). The CPU 901 then finishes the current scan of the switches in the switch group 904.

Figure 12:
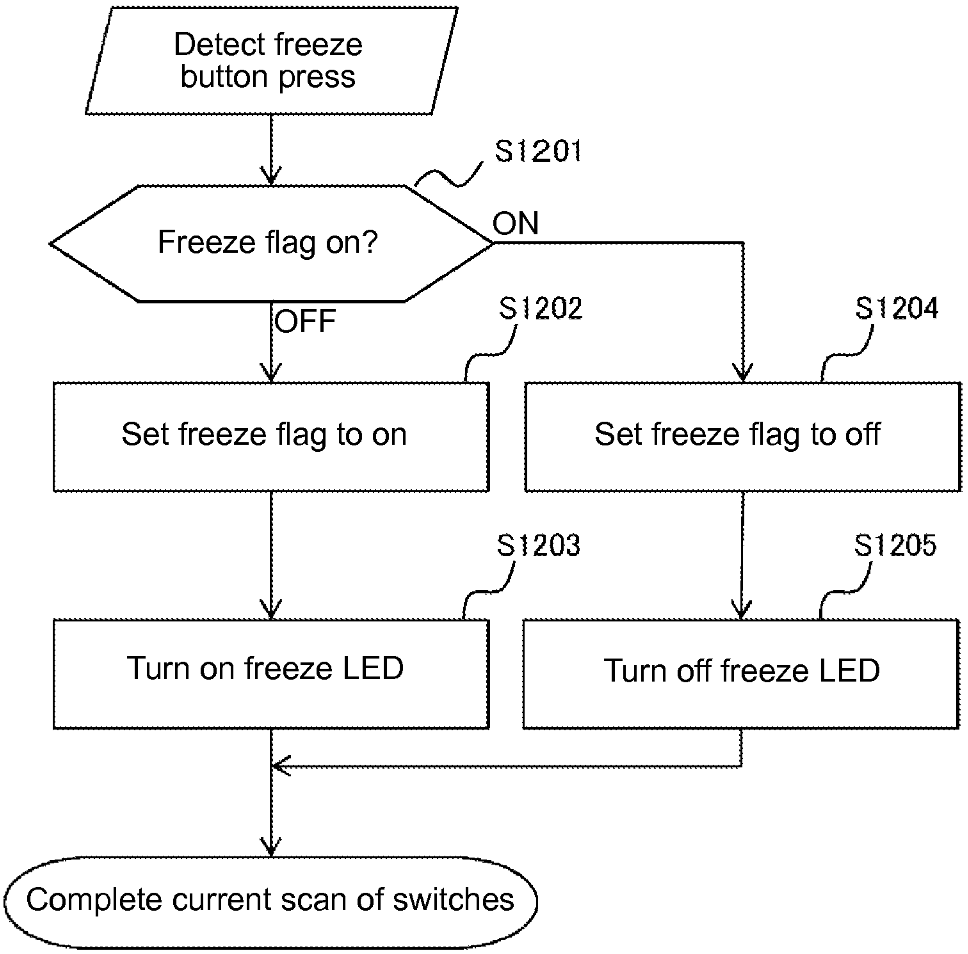
FIG. 12 is a flowchart illustrating an example of a process executed when the device detects that the user has pressed a freeze button.

FIG. 12 is a flowchart illustrating an example of a process executed when the user presses the freeze button 103 shown in FIG. 1 in the switch group 904 shown in FIG. 9.

The freeze button 103 functions like a toggle switch. First, the CPU 901 determines whether a freeze flag variable stored in the RAM 902 is currently set to on or off (S1201).

If the musical sound playback device was not already in the freeze state and the freeze flag is currently set to off, the CPU 901 sets the freeze flag in the RAM 902 to on (that is, to a logical value of 1, for example) (S1202).

Next, the CPU 901 illuminates a freeze LED embedded in the freeze button 103 shown in FIG. 1 in the switch group 904 shown in FIG. 9 (S1203). The CPU 901 then finishes the current scan of the switches in the switch group 904.

Meanwhile, if the musical sound playback device is already in the freeze state and the freeze flag is currently set to on, the CPU 901 sets the freeze flag in the RAM 902 to off (that is, to a logical value of 0, for example) (S1204).

Then, the CPU 901 turns off the freeze LED embedded in the freeze button 103 shown in FIG. 1 in the switch group 904 shown in FIG. 9 (S1205). The CPU 901 then finishes the current scan of the switches in the switch group 904.

Figure 13:
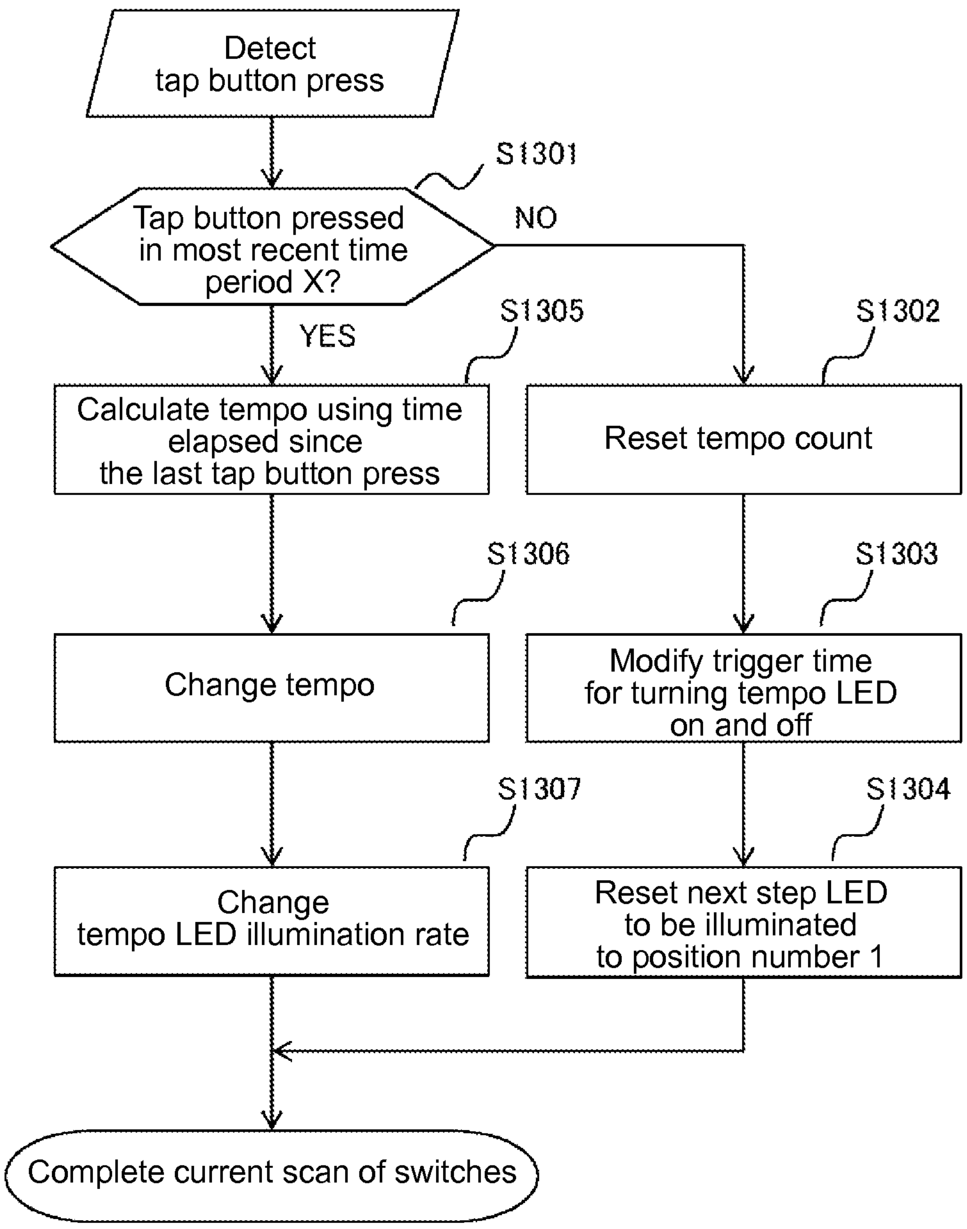
FIG. 13 is a flowchart illustrating an example of a process executed when the device detects that the user has pressed a tap button.

FIG. 13 is a flowchart illustrating an example of a process executed when the user presses the tap button 104 shown in FIG. 1 in the switch group 904 shown in FIG. 9.

First, the CPU 901 determines whether the tap button 104 was pressed within a certain most recent period of time X (S1301).

If the determination in step S1301 yields NO, the CPU 901 resets a tempo count variable stored in the RAM 902 (S1302).

Next, the CPU 901 modifies a trigger time variable that is stored in the RAM 902 and used to turn a tempo LED (not shown in the figures) in the switch group 904 shown in FIG. 9 on and off (S1303).

The CPU 901 then resets the position of the next LED-timing sensor 101 to be illuminated to position number 1 (S1304). The CPU 901 then finishes the current scan of the switches in the switch group 904.

In this way, when the user taps the tap button 104 shown in FIG. 1 a single time, the sequencer is reset to the beginning of the current bar, and the position of the next LED-timing sensor 101 to be illuminated is reset to position number 1.

Meanwhile, if the determination in step 1301 yields YES, the CPU 901 calculates a new tempo value using the time that has elapsed since the tap button 104 was last pressed (S1305).

Next, the CPU 901 changes the tempo value stored in the RAM 902 to the new tempo value calculated in step S1305 (S1306). During playback of automatic musical performance data from the sequencer, the CPU 901 references this new tempo value and changes the rate at which the revolving illumination of the LEDs in the 16 LED-timing sensors 101 shown in FIG. 1 occurs accordingly.

Finally, the CPU 901 changes a tempo LED illumination rate variable stored in the RAM 902 to match the new tempo (S1307). The CPU 901 then finishes the current scan of the switches in the switch group 904.

Figure 14:
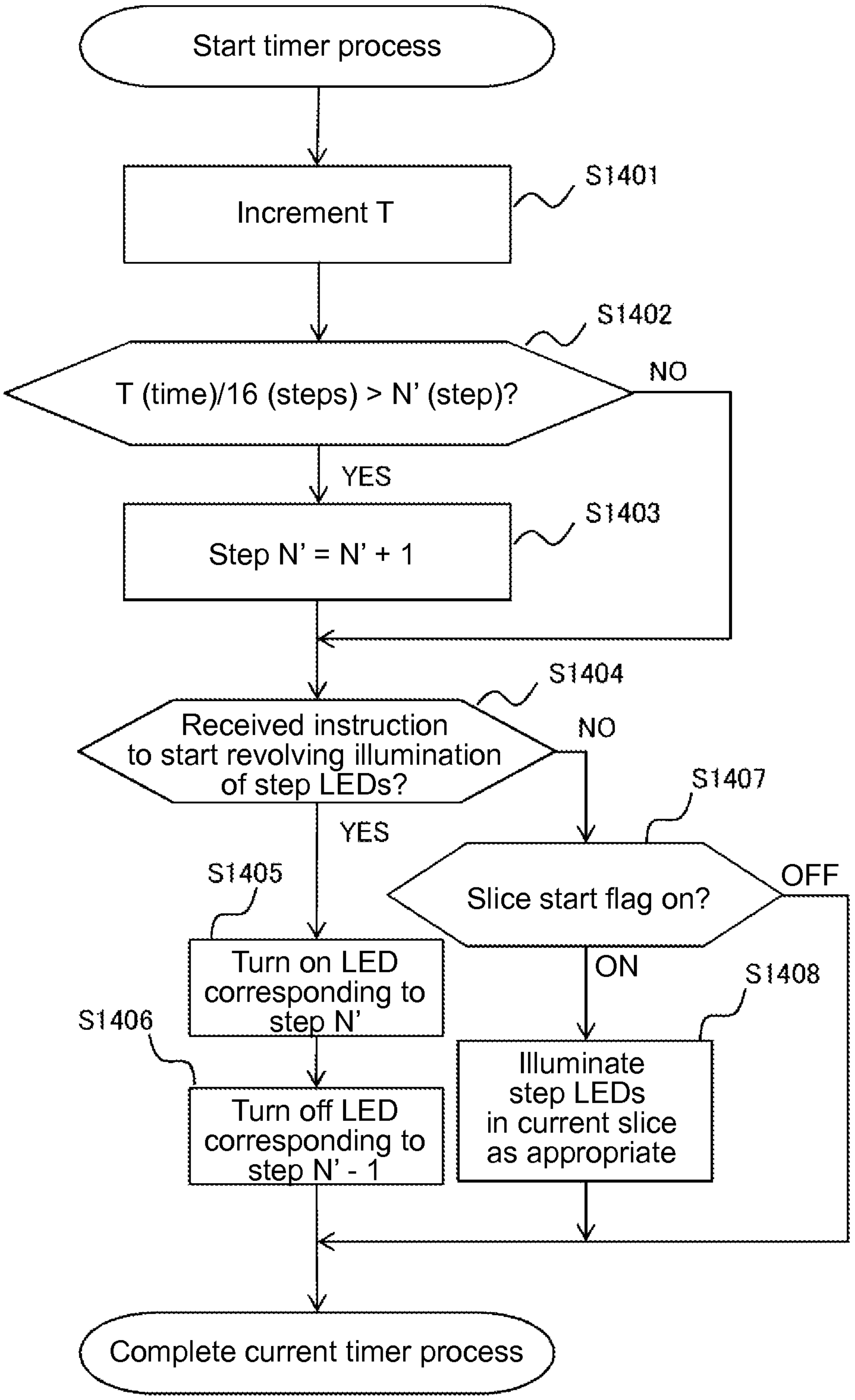
FIG. 14 is a flowchart illustrating an example of a timer process for illuminating the LEDs.

FIG. 14 is a flowchart illustrating an example of a timer process for illuminating the LEDs.

This process runs at fixed time intervals corresponding to timer interrupts. First, the CPU 901 increments a time variable T stored in the RAM 902 (S1401).

Next, the CPU 901 divides the current value of the time variable T by 16 and determines whether the result is greater than a step variable N' stored in the RAM 902 (S1402).

If the determination in step S1402 yields YES, the CPU 901 increments the value of the step variable N' by 1 (S1403). This step variable N' represents a step number from 1 to 16 within a bar of music signal data and is reset to 1 when incremented beyond the maximum value of 16.

If the determination in step S1402 yields NO, the CPU 901 skips step S1403.

Next, the CPU 901 uses the variables stored in the RAM 902 to determine whether an instruction to illuminate the LEDs in the 16 LED-timing sensors 101 shown in FIG. 1 in the revolving manner has been sent (S1404). This instruction is sent when the user has not designated a slice start step.

If the determination in step S1404 yields YES, the CPU 901 illuminates the LED in the LED-timing sensor 101 corresponding to the current value of the step variable N' that was incremented in step S1403 (S1405). The CPU 901 then turns off the LED in the LED-timing sensor 101 in position N'-1 (S1406). Finally, the CPU 901 completes the current timer process. In this way, the 16 LED-timing sensors 101 on the ring-shaped chassis 102 shown in FIG. 1 light up and turn off (on the basis of the value of the step variable N' that is incremented according to a time variable T) in a revolving manner in the clockwise direction indicated by arrow A in FIG. 1 and in time with the music signal data currently being played.

If the determination in step S1404 yields NO, the CPU 901 determines whether the slice start flag stored in the RAM 902 is set to on (S1407).

If the determination in step S1407 yields ON, the CPU 901 turns the LEDs in the LED-timing sensors 101 within the current slice, as indicated by variables stored in the RAM 902 (that is, from the slice start step+1 to the step calculated using the slice length variable stored in the RAM 902) on and off (S1408).

If the determination in step S1407 yields OFF, the CPU 901 skips step S1408.

Finally, the CPU 901 completes the current timer process.

In this way, the LEDs in the LED-timing sensors 101 within the current slice can be turned on and off as appropriate. As shown by the dotted circles in FIGS. 5 and 8, this allows the user to easily see which steps are part of the current slice.

Figure 15:
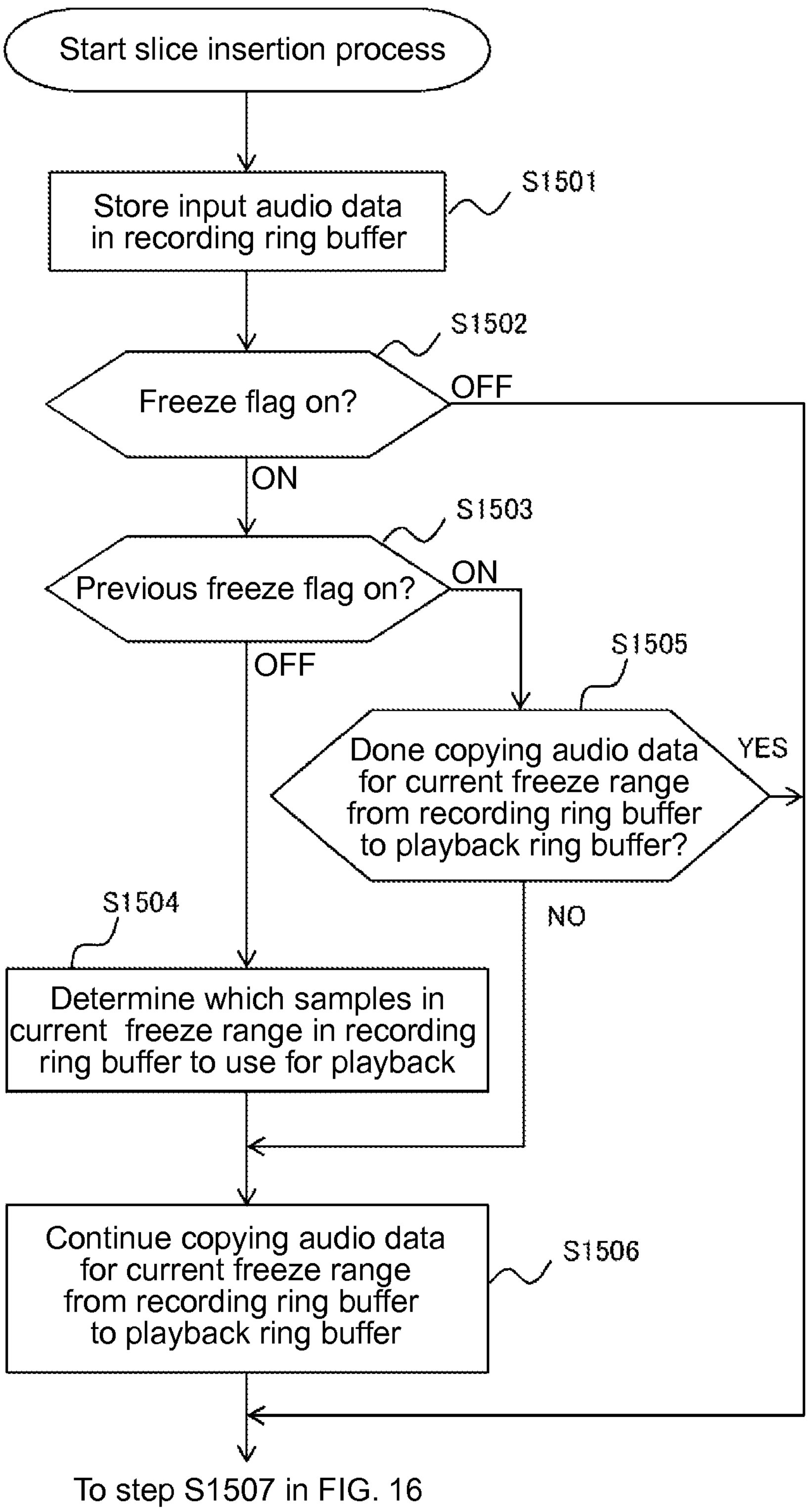
FIG. 15 is a flowchart illustrating the first part of an example of a slice insertion process.
Figure 16:
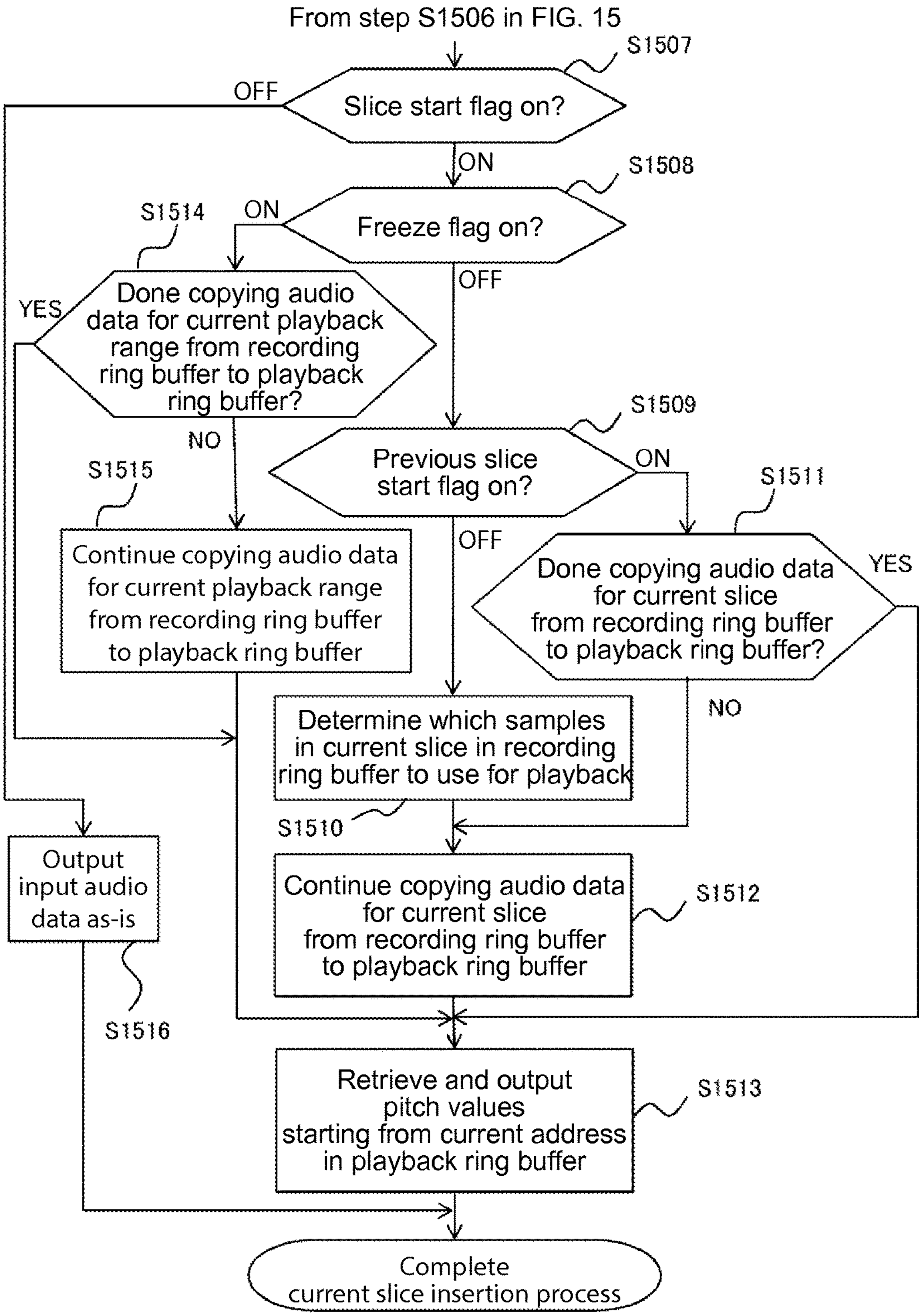
FIG. 16 is a flowchart illustrating the second part of the example of the slice insertion process.

FIGS. 15 and 16 are flowcharts illustrating an example of a slice insertion process. This process is executed at the sampling interval at which the input music signal data is sampled, for example.

First, as described in reference to FIG. 2, the CPU 901 stores a sample of the input music signal data for the current sampling period in the recording ring buffer 201 (S1501). The details of this process were described above in reference to FIG. 2.

Next, the CPU 901 determines whether the freeze flag variable stored in the RAM 902 is currently set to on (S1502).

First, the case in which the device is not in the freeze state and the freeze flag is currently set to off will be described. The process for this case is illustrated by the flowchart in FIG. 16. First, the CPU 901 determines whether the slice start flag variable stored in the RAM 902 is currently set to on (that is, whether the user has started creating an audio slice) (S1507).

If the determination in step S1507 yields OFF, the CPU 901 outputs the input music signal data as-is to the DAC 908 shown in FIG. 9, and the slice insertion process for the current sampling period ends.

If the determination in step S1507 yields ON, this indicates that the user has started using the slicing feature. The CPU 901 then determines whether the freeze flag variable stored in the RAM 902 is currently set to on (S1508).

If the freeze flag is currently set to off, the CPU 901 determines whether the slice start flag variable stored in the RAM 902 was set to on during the previous sampling period (S1509). In order to be able to perform this determination, the CPU 901 may store the current state of the slice start flag in the RAM 902 in preparation for the next sampling period (at which point the value stored is used as the value of the slice start flag for the previous sampling period).

If the slice start flag was set to off during the previous sampling period, the CPU 901 determines which samples in the current slice in the recording ring buffer 201 to use for playback (S1510).

Next, the CPU 901 sequentially copies the data for the current slice from the recording ring buffer 201 to the playback ring buffer 202 (S1512). As described above in reference to FIG. 3, a full bar of music signal data starting from the user-designated slice start step is copied. Moreover, one full sample of data is copied per sampling period.

Next, the CPU 901 retrieves the music signal data (represented as pitch values) from the playback ring buffer 202 starting at the current address and outputs those values to the DAC 908 (S1513). The CPU 901 then ends the slice insertion process for the current sampling period.

If the slice start flag was set to on during the previous sampling period, the CPU 901 determines whether the process for copying the slice (1 full bar) of music signal data determined in step S1510 from the recording ring buffer 201 to the playback ring buffer 202 is complete (S1511).

If the determination in step S1511 yields YES, the CPU 901 proceeds to step S1513 and begins looped playback of the slice of music signal data that was copied to the playback ring buffer 202.

If the determination in step S1511 yields NO, the CPU 901 proceeds to step S1512 and continues copying the current slice of music signal data (1 full bar starting from the slice start step) from the recording ring buffer 201 to the playback ring buffer 202.

Next, the case in which the device is in the freeze state and the freeze flag is currently set to on will be described. In this case, the determination in step S1502 in FIG. 15 yields ON. The CPU 901 then determines whether the freeze flag variable stored in the RAM 902 was set to on during the previous sampling period (S1503). In order to be able to perform this determination, the CPU 901 may store the current state of the freeze flag in the RAM 902 in preparation for the next sampling period (at which point the value stored is used as the value of the freeze flag for the previous sampling period).

If the freeze flag was set to off during the previous sampling period, the CPU 901 determines which samples in the current freeze range in the recording ring buffer 201 to use for playback (S1504).

Next, the CPU 901 sequentially copies the data for the current freeze range from the recording ring buffer 201 to the playback ring buffer 202 (S1506). As described above in reference to FIG. 6, the past full bar of music signal data ending with when the user pressed the freeze button 103 is copied. Moreover, one full sample of data is copied per sampling period.

Next, the CPU 901 proceeds to step S1507 in FIG. 16.

If the freeze flag was set to on during the previous sampling period, the CPU 901 determines whether the process for copying the current freeze range (1 full bar) of music signal data determined in step S1504 from the recording ring buffer 201 to the playback ring buffer 202 is complete (S1505).

If the determination in step S1505 yields YES, the CPU 901 proceeds to step S1507 in FIG. 16.

If the determination in step S1505 yields NO, the CPU 901 proceeds to step S1506 and continues copying the current freeze range of music signal data from the recording ring buffer 201 to the playback ring buffer 202.

Next, the behavior of the device when the user uses the slicing feature while the device is in the freeze state will be described. This corresponds to when the determination in step S1507 in FIG. 16 yields ON and then the determination in step S1508 also yields ON. In this case, the CPU 901 determines whether the process for copying the slice of music signal data designated in the playback ring buffer 202 from the recording ring buffer 201 to the playback ring buffer 202 is complete (S1514). This determination is performed for the following reason. When the device is put into the freeze state, the music signal data copied from the recording ring buffer 201 to the playback ring buffer 202 is the past one full bar of music signal data. Therefore, if the user starts creating a slice while the device is still transitioning into the freeze state, all of the necessary music signal data may not have been fully copied to the playback ring buffer 202 yet.

If the determination in step S1514 yields NO, the CPU 901 first copies the music signal data corresponding to the sliced playback range from the recording ring buffer 201 to the playback ring buffer 202 in parallel with the process for copying music signal data from the recording ring buffer 201 to the playback ring buffer 202 from step S1506 in FIG. 15. This range of data gets overwritten later in step S1506. However, the data used to overwrite this range is the same as the data in the range itself, so no data is lost.

If the determination in step S1514 yields YES, the CPU 901 skips step S1515.

Next, the CPU 901 proceeds to step S1513 and retrieves the music signal data (represented as pitch values) from the playback ring buffer 202 starting at the current address and outputs those values to the DAC 908 (S1513).

In the above description of the present embodiment, it was assumed that the musical sound playback device required a crossfader and the like and would be used in conjunction with a musical instrument having an external input and a built-in sequencer supporting configuration of tempo settings. However, the essential technical feature of the present embodiment is the audio slicing feature, and the methods/components used to input music signal data to the musical sound playback device are not limited in any way. Moreover, the present embodiment is configured for a situation in which each bar of music signal data is divided into 16 segments during playback. However, the present embodiment is not limited to this configuration.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A playback device, comprising:

a first buffer and a second buffer, the first buffer having a plurality of first storage regions;

a plurality of designation keys, a number of the designation keys being same as a number of the plurality of first storage regions in the first buffer such that the plurality of designation keys respectively correspond to the plurality of first storage regions; and a processor, wherein the processor performs:

a storage process that causes at least a part of input audio data that has a plurality of segments to be stored respectively in the plurality of first storage regions of the first buffer;

a first playback process that causes said at least a part of input audio data stored in the first buffer to be played back;

a copy process that, in response to a user input selecting at least one of the designation keys, causes segment data that are stored in the first storage region or regions that correspond to the selected at least one of the designation keys, including at least one segment of the audio data, to be copied to the second buffer; and a second playback process that causes the segment data that have been copied to the second buffer by the copy process to be played back while terminating the first playback process.

2. The playback device according to claim 1, wherein the processor, during said processes, starts performing the second playback process in response to the audio data being copied to the second buffer.

3. The playback device according to claim 1, wherein the processor stops performing the first playback process when the second playback process starts.

4. The playback device according to claim 1, wherein the processor determines the first storage region or regions of the first buffer from which the stored audio data are to be copied to the second buffer in accordance with a timing of the user input while the audio data is played back during the first playback process, and wherein the processor performs the copy process each time a new user input selecting at least one of the designation keys is received.

5. The playback device according to claim 1, wherein the processor performs a freezing process that causes a prescribed segment of the audio data that has been stored in the first buffer to be copied to the second buffer, said prescribed segment having a start point that can be set in accordance with a user input, and wherein the processor designates at least one of storage regions of the second buffer in which the prescribed segment of audio data has been stored in response to a user input that is performed after the freezing process has been performed.

6. The playback device according to claim 1, wherein the audio data includes musical data input from an external source.

7. The playback device according to claim 6, wherein said musical data includes rhythm audio data for a plurality of bars of music that are played back at a designated tempo, and wherein the first buffer stores musical data that has a duration greater than or equal to one bar of music as defined by the rhythm sounds.

8. The playback device according to claim 7, further comprising:

a display unit that, when the musical data from at least one of the first playback process and the second playback process is played back, displays timing of the respective rhythm sounds representing the full bar of music.

9. The playback device according to claim 1, wherein the first buffer and the second buffer are ring buffers.

10. A playback method for a playback device that includes a first buffer having a plurality of first storage regions, a second buffer, and a plurality of designation keys, a number of the designation keys being same as a number of the plurality of first storage regions in the first buffer such that the plurality of designation keys respectively correspond to the plurality of first storage regions, the playback method comprising:

storing at least a part of input audio data that has a plurality of segments, respectively, in the plurality of first storage regions of the first buffer;

playing back the at least a part of the input audio data that have been stored in the first buffer;

in response to a user input, selecting at least one of the designation keys, copying segment data that are stored in the first storage region or regions that correspond to the selected at least one of the designation keys, including at least one segment of the audio data, to the second buffer; and playing back the segment data that have been copied to the second buffer while terminating the playing back of the at least a part of the input audio data stored in the first buffer.

11. A non-transitory storage medium that stores instructions executable by a playback device having a processor a first buffer having a plurality of first storage regions, a second buffer, and a plurality of designation keys, a number of the designation keys being same as a number of the plurality of first storage regions in the first buffer such that the plurality of designation keys respectively correspond to the plurality of first storage regions, said instructions causing the processor of the playback device to perform the following:

causing at least a part of input audio data that has a plurality of segments to be stored respectively in the plurality of first storage regions of the first buffer;

causing said at least a part of input audio data stored in the first buffer to be played back;

in response to a user input selecting at least one of the designation keys, causing segment data that are stored in the first storage region or regions that correspond to the selected at least one of the designation keys, including at least one segment of the audio data, to be copied to the second buffer; and causing the segment data that have been copied to the second buffer to be played back while terminating the playback of said at least a part of input audio data stored in the first buffer.

12. The playback device according to claim 1, wherein while the processor performs the second playback process, the processor continues to perform the storage process, thereby updating the first buffer with newly received input audio data, and wherein when said selection of said at least one of the designation key is reset, the processor ceases the second playback process and starts performing the first playback process with input audio data that have been stored in the updated first buffer.

13. The playback device according to claim 1, wherein each of the designation keys has a user recognizable indicator so that when a user selects one or more of the designation keys, the user recognizable indicator is activated to indicate to the user that said one or more of the designation keys are selected by the user.

14. The playback device according to claim 1, wherein said plurality of designation keys are arranged on a ring-shaped chassis.

15. The playback device according to claim 1, wherein said plurality of designation keys are arranged on a ring-shaped chassis, and said user recognizable indicator is a light emitting device that emits light to indicate to the user that the corresponding designation key is selected by the user.

16. The playback device according to claim 1, wherein each of said segments has a duration of at least one musical note in said input audio data, wherein segment data having said duration of at least one musical note is stored in each of the plurality of first storage regions, and wherein the plurality of first storage regions in the first buffer sequentially store audio data of one full bar in the input audio data.

* * * * *